(12) United States Patent
Yoshimizu

(10) Patent No.: US 9,749,486 B2
(45) Date of Patent: Aug. 29, 2017

(54) SHEET FEEDER, IMAGE PROCESSING APPARATUS, METHOD OF FEEDING SHEET, AND NON-TRANSITORY RECORDING MEDIUM

(71) Applicant: Eiki Yoshimizu, Kanagawa (JP)

(72) Inventor: Eiki Yoshimizu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/927,021

(22) Filed: Oct. 29, 2015

(65) Prior Publication Data

US 2016/0139554 A1    May 19, 2016

(30) Foreign Application Priority Data

Nov. 18, 2014   (JP) .................. 2014-233943

(51) Int. Cl.
| | |
|---|---|
| *G03G 15/00* | (2006.01) |
| *H04N 1/00* | (2006.01) |
| *B65H 7/02* | (2006.01) |
| *H04N 1/21* | (2006.01) |
| *B65H 9/00* | (2006.01) |

(52) U.S. Cl.
CPC ........... *H04N 1/00774* (2013.01); *B65H 7/02* (2013.01); *B65H 9/008* (2013.01); *G03G 15/5029* (2013.01); *G03G 15/6558* (2013.01); *H04N 1/00681* (2013.01); *H04N 1/00716* (2013.01); *H04N 1/21* (2013.01); *B65H 2511/13* (2013.01); *B65H 2511/212* (2013.01); *B65H 2515/702* (2013.01); *B65H 2557/264* (2013.01)

(58) Field of Classification Search
CPC   B65H 2511/13; B65H 7/02; B65H 2511/212; G03G 15/6558; H04N 1/00774; H04N 1/21; H04N 1/00681
See application file for complete search history.

(56) References Cited

U.S. PATENT DOCUMENTS

| | | | | |
|---|---|---|---|---|
| 5,432,419 A | * | 7/1995 | Watanabe | ............ G11B 17/26 318/362 |
| 5,986,775 A | | 11/1999 | Yoshimizu | |
| 6,400,472 B1 | | 6/2002 | Yoshimizu | |
| 2011/0310145 A1 | * | 12/2011 | Samoto | ............... B41J 11/42 347/9 |
| 2013/0009355 A1 | * | 1/2013 | Yasuda | ................... B65H 1/14 271/127 |

FOREIGN PATENT DOCUMENTS

| | | |
|---|---|---|
| JP | 2009173380 A | 8/2009 |
| JP | 2013-129490 | 7/2013 |
| JP | 2014-009085 | 1/2014 |
| JP | 2014-118238 | 6/2014 |

* cited by examiner

*Primary Examiner* — Matthew G Marini
(74) *Attorney, Agent, or Firm* — Harness, Dickey & Pierce, P.L.C.

(57) ABSTRACT

A sheet feeder is provided. The sheet feeder includes a roller to feed a sheet, a motor to rotate the roller, and a motor controller to control rotation of the motor by a feedback control. The motor controller detects a condition of the sheet based on a value acquired in the feedback control at the time a load is applied from the sheet to the roller, while performing a stop control to stop the roller at a designated stop position. The stop control is performed after the motor is rotated in a direction opposite to a direction of feed of the sheet.

15 Claims, 13 Drawing Sheets

| SHEET TYPE | YOUNG'S MODULUS | SHEET WIDTH |
|---|---|---|
| PLAIN PAPER | $E_0$ | $a_0$ |
| COATED PAPER | $E_1$ | $a_1$ |
| xxxx PAPER | $E_2$ | $a_2$ |
| xxxx PAPER | $E_3$ | $a_3$ |
| . . . | | |

FIG. 16A
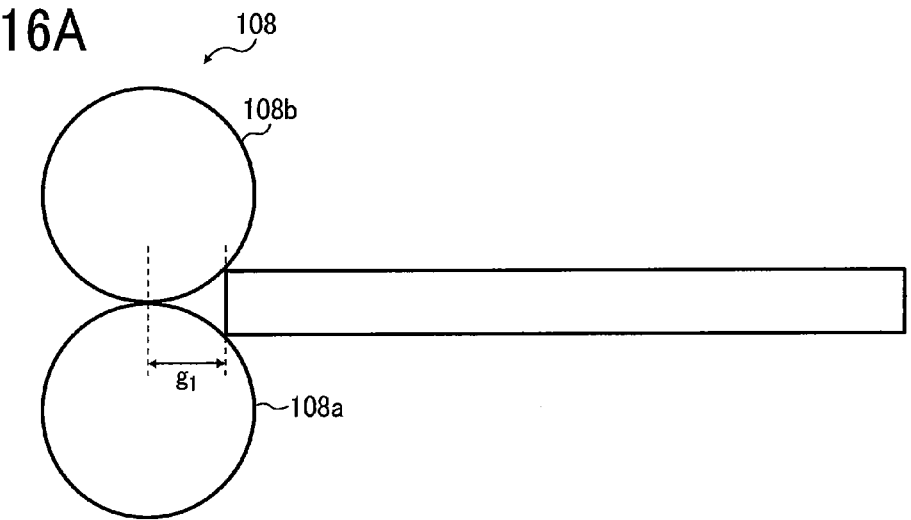
FIG. 16B
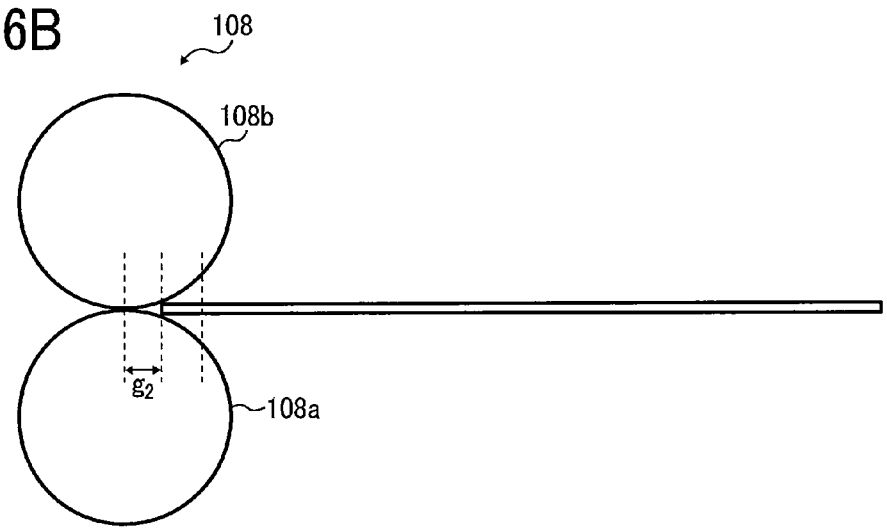
FIG. 17
| SHEET THICKNESS | ADJUSTMENT VALUE |
|---|---|
| $t_1$ | $g_1$ |
| $t_2$ | $g_2$ |
| $t_3$ | $g_3$ |
| $t_4$ | $g_4$ |
| . . . | |

| SHEET THICKNESS | FEATURE QUANTITY DATA | SHEET TYPE |
|---|---|---|
| XXX μm | xxxxxx , xxxxxx , xxxxxx ··· | PLAIN PAPER |
| XXX μm | xxxxxx , xxxxxx , xxxxxx ··· | COATED PAPER |
| XXX μm | xxxxxx , xxxxxx , xxxxxx ··· | xxxx PAPER |
| XXX μm | xxxxxx , xxxxxx , xxxxxx ··· | xxxx PAPER |
| XXX μm | xxxxxx , xxxxxx , xxxxxx ··· | xxxx PAPER |
| XXX μm | xxxxxx , xxxxxx , xxxxxx ··· | xxxx PAPER |
| XXX μm | xxxxxx , xxxxxx , xxxxxx ··· | xxxx PAPER |
| | ···· | |

US 9,749,486 B2

SHEET FEEDER, IMAGE PROCESSING APPARATUS, METHOD OF FEEDING SHEET, AND NON-TRANSITORY RECORDING MEDIUM

CROSS-REFERENCE TO RELATED APPLICATIONS

This patent application is based on and claims priority pursuant to 35 U.S.C. §119(a) to Japanese Patent Application No. 2014-233943, filed on Nov. 18, 2014, in the Japan Patent Office, the entire disclosure of which is hereby incorporated by reference herein.

BACKGROUND

Technical Field

The present disclosure related to a sheet feeder, an image processing apparatus, a method of feeding sheet, and a non-transitory recording medium.

Description of the Related Art

In accordance with a recent trend of propelling electronization of information, image processing apparatuses are being demanded. Such image processing apparatuses include printer and facsimile machine for outputting electronized information and scanner for electronizing documents. Having functions of imaging, image formation, communication, and the like, most image forming apparatuses configure a multifunction peripheral that can be used as printer, facsimile machine, scanner, and copier.

In some image processing apparatuses, the thickness of a sheet-like object, such as a paper sheet serving as a recording medium on which an image is to be formed or a document serving as an object to be read, should be detected.

SUMMARY

In accordance with some embodiments of the present invention, a sheet feeder is provided. The sheet feeder includes a roller to feed a sheet, a motor to rotate the roller, and a motor controller to control rotation of the motor by a feedback control. The motor controller detects a condition of the sheet based on a value acquired in the feedback control at the time a load is applied from the sheet to the roller, while performing a stop control to stop the roller at a designated stop position. The stop control is performed after the motor is rotated in a direction opposite to a direction of feed of the sheet.

In accordance with some embodiments of the present invention, a method of feeding a sheet by a roller is provided. The method includes the steps of: controlling a motor for rotating the roller by a feedback control; detecting a condition of the sheet based on a value acquired in the feedback control at the time a load is applied from the sheet to the roller, while performing a stop control to stop the roller at a designated stop position; and performing the stop control after the motor is rotated in a direction opposite to a direction of feed of the sheet.

In accordance with some embodiments of the present invention, a non-transitory recording medium is provided. The non-transitory recording medium stores a plurality of instructions which, when executed by one or more processors, cause the processors to perform the above method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 16A and 16B are illustrations showing registration positions varied depending on the sheet thickness in accordance with an embodiment of the present invention;

FIG. 17 is an example of a table listing values for adjusting the registration position according to the sheet thickness;

Figure 1:
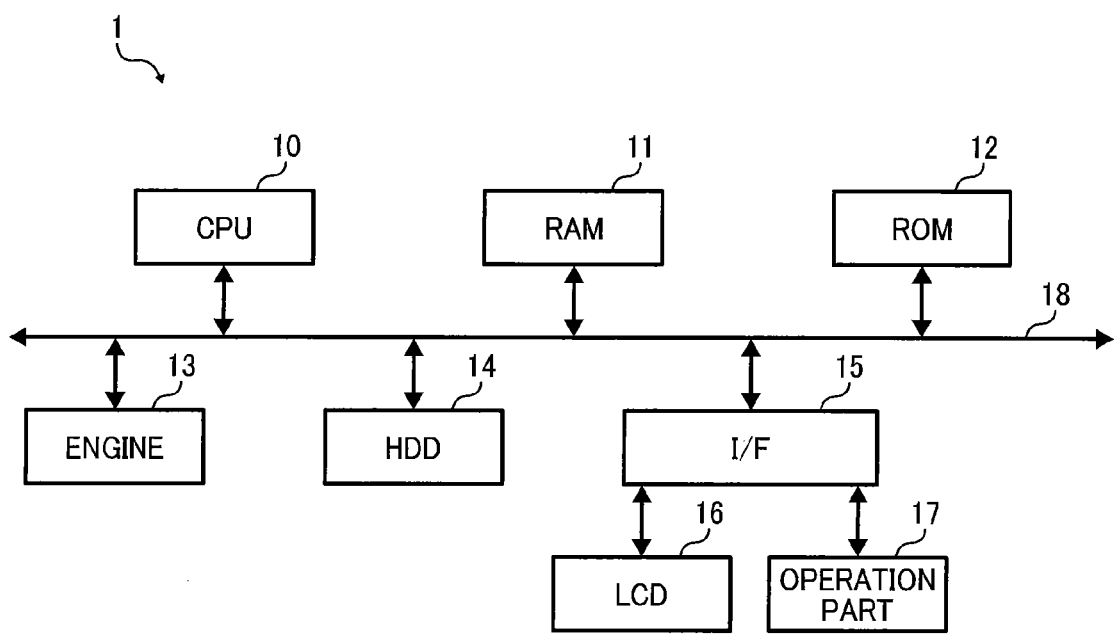
FIG. 1 is a block diagram illustrating a hardware configuration of an image processing apparatus in accordance with an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In accordance with some embodiments of the present invention, in detecting a condition of a sheet using a load applied to a roller, the accuracy of the detecting can be improved by eliminating the influence of a backlash caused in power transmission.

An embodiment of the present invention is described below with reference to the accompany drawings. The present embodiment provides a sheet feeder for feeding a sheet on which an image is to be formed in an image forming apparatus, particularly having a function of detecting the thickness of the sheet based on a feedback value of a motor under a feedback control. According to the present embodiment, the sheet feeder can eliminate a detection error occurring due to a backlash caused in a mechanism for transmitting power from a motor to a roller.

FIG. 1 is a block diagram illustrating a hardware configuration of an image processing apparatus 1 in accordance with an embodiment of the present invention. The image processing apparatus 1 has a configuration similar to that of a typical image processing terminal, such as a server or personal computer (PC), and further includes an engine to execute an image formation. Specifically, the image processing apparatus 1 includes a central processing unit (CPU) 10, a random access memory (RAM) 11, a read only memory (ROM) 12, an engine 13, a hard disk drive (HDD) 14, and an interface (I/F) 15, all of which are connected through a bus 18. In addition, a liquid crystal display (LCD) 16 and an operation unit 17 are connected to the I/F 15.

The CPU 10 is a calculator that controls the entire operation of the image processing apparatus 1. The RAM 11 is a high-speed read-write volatile storage medium serving as a working area in which the CPU processes information. The ROM 12 is a read-only non-volatile storage medium in which programs (e.g., firmware) are stored. The engine 13 is a mechanism that executes an image formation.

The HDD 14 is a read-write non-volatile storage medium in which the operating system (OS) and various control programs and application programs are stored. The I/F 15 connects the bus 18 to the various hardware and networks, and controls them. The LCD 16 is a visual user interface allowing user to check the status of the image processing apparatus 1. The operation unit 17 is a user interface, such as a keyboard and/or a mouse, allowing user to input information to the image processing apparatus 1.

As the CPU 10 performs a calculation according to a program stored in the ROM 12 or a program read from the HDD 14 or another recording medium (e.g., optical disc) to the RAM 11, a software controller is configured. A combination of the software controller thus configured with the hardware configures a functional block which implements the function of the image processing apparatus 1.

Figure 2:
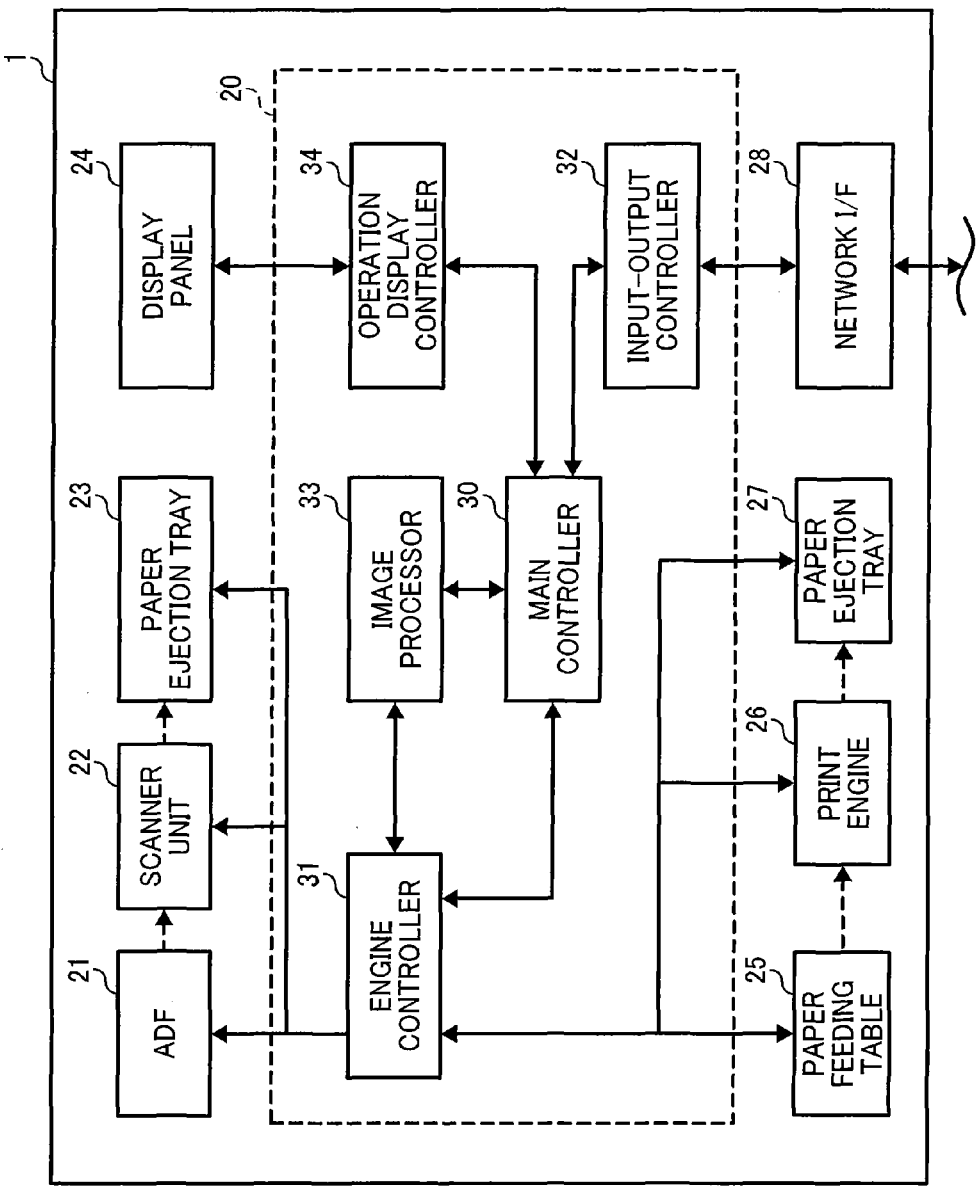
FIG. 2 is a block diagram illustrating a functional configuration of the image processing apparatus in accordance with an embodiment of the present invention.

A functional configuration of the image processing apparatus 1 is described below with reference to FIG. 2. FIG. 2 is a block diagram illustrating a functional configuration of the image processing apparatus 1 in accordance with an embodiment of the present invention. The image processing apparatus 1 includes a controller 20, an automatic document feeder (ADF) 21, a scanner unit 22, a paper ejection tray 23, a display panel 24, a paper feeding table 25, a print engine 26, a paper ejection tray 27, and a network I/F 28.

The controller 20 includes a main controller 30, an engine controller 31, an input-output controller 32, an image processor 33, and an operation display controller 34. The image processing apparatus 1 configures a multifunction peripheral including the scanner unit 22 and the print engine 26. In FIG. 2, solid-line arrows represent electric connections and dotted-line arrows represent the flows of sheets.

The display panel 24 serves as both an output interface for visually displaying the status of the image processing apparatus 1 and an input interface (operation unit), such as a touch panel, for allowing user to directly operate the image processing apparatus 1 or input information to the image processing apparatus 1. The network I/F 28 is an interface, such as Ethernet (registered trademark) and universal serial bus (USB), for allowing the image processing apparatus 1 to communicate with other devices therethrough.

The controller 20 is composed of a combination of software and hardware. Specifically, the controller 20 is composed of the software controller configured by the calculation performed by the CPU 10 and a hardware such as an integrated circuit. The controller 20 functions as a controller that controls the entire image processing apparatus 1.

The main controller 30 controls each part of the controller 20 by giving commands thereto. The engine controller 31 serves as a driver for controlling or driving the print engine 26, the scanner unit 22, or the like. The input-output controller 32 inputs a signal or command input through the network I/F 28 to the main controller 30. The main controller 30 controls the input-output controller 32 and accesses other devices through the network I/F 28.

According to the control of the main controller 30, the image processor 33 generates drawing information based on print information included in the input print job. The drawing information is used by the print engine 26, serving as an image forming unit, for drawing an image to be formed during an image forming operation. The print information included in the print job is image information having been converted by a printer driver installed in an information processing apparatus (e.g., PC) into a form recognizable by the image processing apparatus 1. The operation display controller 34 displays information on the display panel 24, or notifies the main controller 30 of information input through the display panel 24.

When the image processing apparatus 1 operates as a printer, first, the input-output controller 32 receives a print job through the network I/F 28. The input-output controller 32 transfers the received print job to the main controller 30. Upon receipt of the print job, the main controller 30 controls the image processor 33 to generate drawing information based on print information included in the print job.

Upon generation of the drawing information by the image processor 33, the engine controller 31 controls the print engine 26 based on the generated drawing information to execute an image formation on a sheet of paper fed from the paper feeding table 25 serving as a sheet storage. Thus, the print engine 26 functions as an image forming unit. The sheet on which an image has been formed by the print engine 26 is ejected on the paper ejection tray 27.

When the image processing apparatus 1 operates as a scanner, according to an operation made on the display panel 24 by user or a scan execution instruction input from an external device (e.g., PC) through the network I/F 28, the operation display controller 34 or the input-output controller 32 transfers a scan execution signal to the main controller 30. The main controller 30 controls the engine controller 31 based on the received scan execution signal.

The engine controller 31 drives the ADF 21 to feed a to-be-imaged document set in the ADF 21 to the scanner unit 22. The engine controller 31 also drives the scanner unit 22 to image the document fed from the ADF 21. In the case where the document is directly set in the scanner unit 22 without being set in the ADF 21, the scanner unit 22 images the set document according to the control of the engine controller 31. Thus, the scanner unit 22 operates as an imaging unit.

During the imaging operation, an imaging element (e.g., charge-coupled device (CCD)) included in the scanner unit 22 optically scans the document to generate imaging information based on optical information. The engine controller 31 transfers the imaging information generated by the scanner unit 22 to the image processor 33. According to the control of the main controller 30, the image processor 33 generates image information based on the imaging information received from the engine controller 31. The image information generated by the image processor 33 is stored in a storage medium mounted on the image processing apparatus 1, such as the HDD 14. Thus, the scanner unit 22, the engine controller 31, and the image processor 33 cooperatively function as a document reader.

The image information generated by the image processor 33 is stored in the storage medium (e.g., HDD 14) in accordance with an instruction by user, or transmitted to an external device through the input-output controller 32 and the network I/F 28. Thus, the ADF 21 and the engine controller 31 function as an image input unit.

When the image processing apparatus 1 operates as a copier, the image processor 33 generates drawing information based on the imaging information received by the engine controller 31 from the scanner unit 22 or the image information generated by the image processor 33. Similar to the case of printer operation, the engine controller 31 drives the print engine 26 based on the drawing information.

Figure 3:
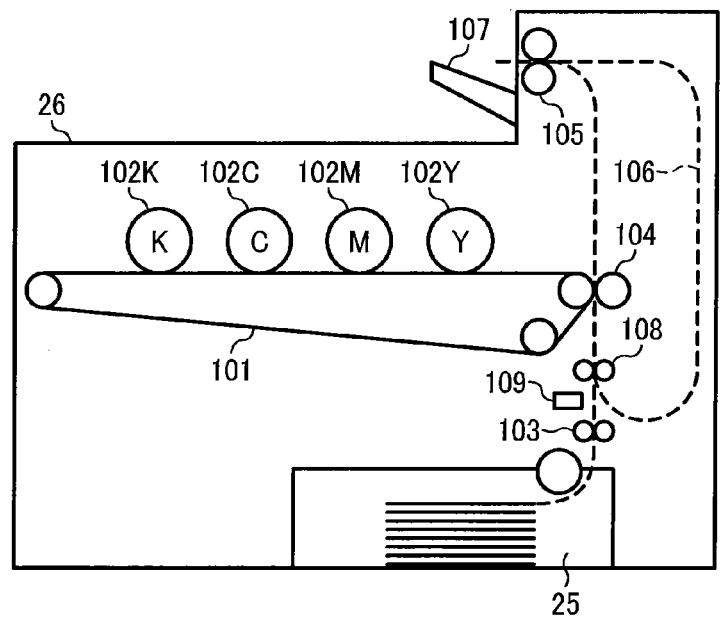
FIG. 3 is a schematic view illustrating a mechanical configuration of a print engine in accordance with an embodiment of the present invention.

A mechanical configuration and a sheet feeding path of the print engine 26 are described below with reference to FIG. 3. The print engine 26 includes a conveyance belt 101 that is an endless movable body and photoconductor drums 102Y, 102M, 102C, and 102K (hereinafter collectively "photoconductor drums 102") arranged in tandem along the conveyance belt 101.

The conveyance belt 101 is an intermediate transfer belt on which an intermediate transfer image is to be formed. The intermediate image is to be further transferred onto a sheet of paper fed from the paper feeding table 25. In the print engine 26, the photoconductor drums 102 are arranged along the conveyance belt 101 in the order of, from an upstream side relative to the direction of conveyance of the conveyance belt 101, 102Y, 102M, 102C, and 102K.

On the surface of each of the photoconductor drums 102, an image is developed with a different-color toner. These images are superimposed on one another on the conveyance belt 101, and the resulting composite image is transferred onto a sheet of paper. Thus, a full-color image is formed. The full-color image formed on the conveyance belt 101 is transferred onto a sheet fed through a sheet feeding path, shown by dotted lines in FIG. 3, by a function of a transfer roller 104 at a position closet to the sheet feeding path.

The sheet on which the image has been formed is further fed so that the image is fixed on the sheet by a fixing roller 105. The sheet having the fixed image thereon is ejected onto a paper ejection tray 107. In the case of duplex printing, the sheet having the fixed image on one side thereof is fed to a reverse path 106 to get reversed, and the reversed sheet is refed to the position of the transfer roller 104.

Figure 4:
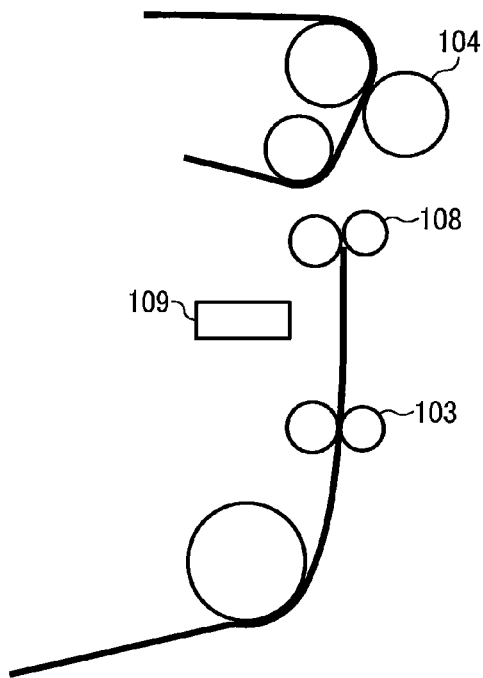
FIG. 4 is a schematic view illustrating a configuration around a registration roller in accordance with an embodiment of the present invention.

FIG. 4 is a schematic view illustrating the sheet feeding path in the print engine 26 for feeding sheets fed from the paper feeding table 25. A sheet fed from the paper feeding table 25 is further fed by a feed roller pair 103 and allowed to butt against a registration roller pair 108. The registration roller pair 108 synchronizes a timing of feeding the sheet with a timing that the transfer roller 104 transfers an image on the sheet. Thus, the registration roller pair 108 functions as a butting roller pair.

The sheet butted against the registration roller pair 108 is further fed by the feed roller pair 103. As a result, the sheet bends (not stretched but retains slack) between the feed roller pair 103 and the registration roller pair 108, thereby forming a loop.

As the registration roller pair 108 starts rotating at the controlled timing, the butted sheet is fed toward the transfer roller 104, and an image is transferred onto the sheet at the controlled timing. A sheet passing sensor 109 is disposed between the feed roller pair 103 and the registration roller pair 108 to detect existence or non-existence of sheet therebetween. The sheet passing sensor 109 detects a sheet being fed reaching a predetermined feed position.

The feed roller pair 103 and the registration roller pair 108 are rotary driven by a feedback-controlled motor to feed a sheet at a predetermined feed speed. In the present embodiment, the thickness of the sheet is detected based on a signal obtained through a mechanism for controlling the registration roller pair 108.

Figure 5:
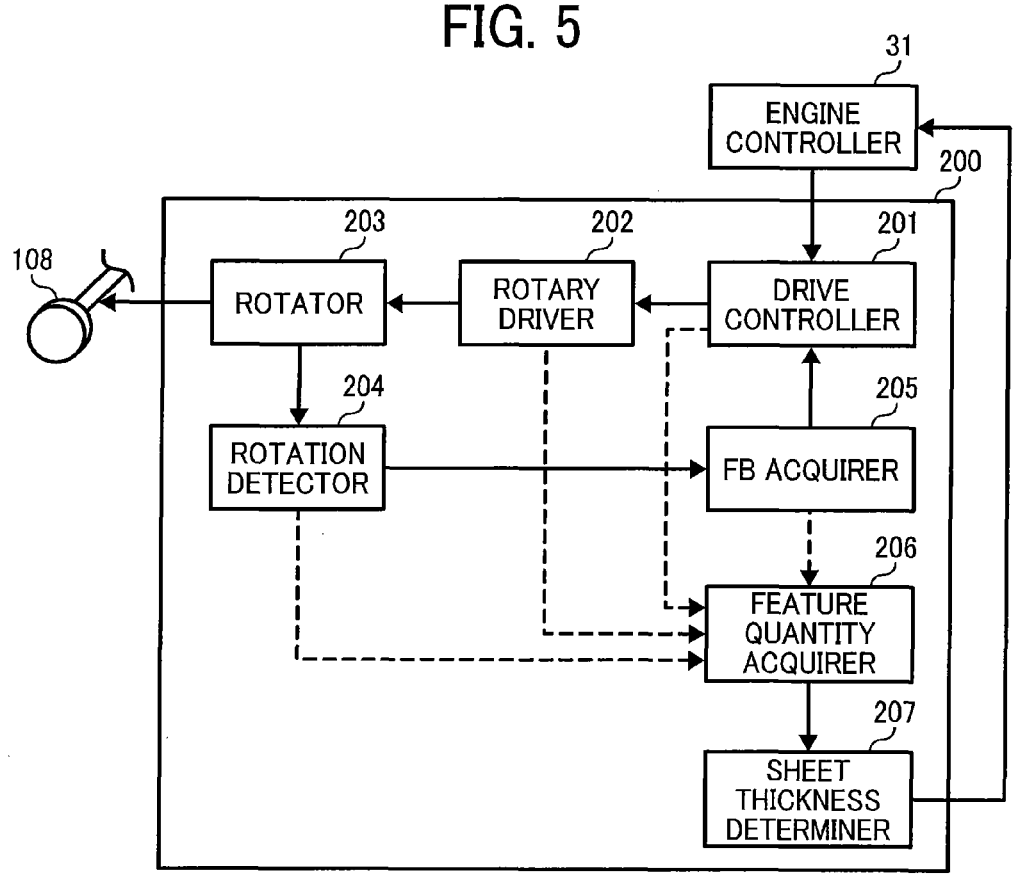
FIG. 5 is a block diagram illustrating a control configuration of the registration roller in accordance with an embodiment of the present invention.

FIG. 5 is a block diagram illustrating a functional configuration of a roller drive controller 200 for rotary driving the registration roller pair 108. The roller drive controller 200 operates to rotary drive the registration roller pair 108 in the print engine 26 illustrated in FIG. 2 based on commands from the engine controller 31.

Referring to FIG. 5, the roller drive controller 200 includes a drive controller 201, a rotary driver 202, a rotator 203, a rotation detector 204, a feedback (FB) acquirer 205, a feature quantity acquirer 206, and a sheet thickness determiner 207. The roller drive controller 200 having such a configuration functions as a feedback controller for feedback-controlling rotation of the registration roller pair 108.

The drive controller 201 calculates a control value for rotating the rotator 203 based on a target value of the rotation speed of the rotator 203 input from the engine controller 31 and a feedback signal input from the FB acquirer 205. The drive controller 201 outputs the calculated control value to the rotary driver 202. The control value output by the drive controller 201 is an instruction value for the duty cycle of a drive voltage that is a pulse-width modulation (PWM) output for rotating the rotator 203. The rotary driver 202 generates and outputs a drive voltage for rotating the rotator 203 based on the control value input from the drive controller 201.

The rotary driver 202 has functions of both outputting a low-voltage PWM driving signal based on the control value output by the drive controller 201 and outputting a high-voltage drive voltage based on the PWM driving signal. The PWM driving signal may be, for example, a PWM signal having a voltage of about 5 V. The drive voltage is a voltage output upon switching of a drive voltage of about 24 V based on the PWM drive signal.

The rotator 203 is a motor that rotates in accordance with the drive voltage input from the rotary driver 202. As the rotator 203 rotates, the registration roller pair 108 rotates through a drive transmission mechanism such as a gear, a timing belt, or the like. The rotator 203 may be a direct current (DC) motor. For example, inner rotor type DC motors such as a brushless DC motor and a brush DC motor can be used. The rotator 203 includes a circular disc having a marker used for detecting the rotation speed or rotation position. The rotation detector 204 is an optical encoder that optically reads the marker and outputs a detection signal.

Specifically, the marker on the circular disc rotates along with rotation of the rotator 203 and passes through a reading position where the rotation detector 204 performs an optical reading. The rotation detector 204 detects the marker by detecting a change in the optical reading condition, and outputs a detection signal.

The rotation detector 204 includes a set of two sensors. The two sensors are arranged in such a manner that they detect the marker on the circular disc with a phase difference of $\pi/2$ (rad). Accordingly, the rotation detector 204 outputs two detection signals having a phase difference of $\pi/2$ (rad) therebetween.

The FB acquirer 205 acquires the detection signals from the rotation detector 204, calculates the rotation speed of the rotator 203 based on the number of times that the marker is detected per unit time, and inputs the calculated value to the drive controller 201 as a feedback value. The FB acquirer 205 also detects the direction of rotation of the rotator 203 based on the phase difference of $\pi/2$ (rad) between the two detection signals.

The drive controller 201 outputs a control value for rotating the rotator 203 based on the difference between the target value input from the engine controller 31 and the feedback value input from the FB acquirer 205.

The feature quantity acquirer 206 acquires a feature quantity that indicates the rotation state of the rotator 203 in the above-described feedback control cycle performed by the roller drive controller 200. As shown by dotted lines in FIG. 5, the detection signal output from the rotation detector 204 and acquired by the FB acquirer 205, or the rotation speed of the rotator 203 calculated by the FB acquirer 205 can be used as the feature quantity indicating the rotation state of the rotator 203.

Additionally, the control value input from the drive controller 201 to the rotary driver 202 can also be used as the feature quantity. Moreover, the drive voltage output by the rotary driver 202 can also be used as the feature quantity. The values serve as a feedback value in the feedback control. The feature quantity acquirer 206 inputs the acquired feature quantity to the sheet thickness determiner 207. The sheet thickness determiner 207 determines the thickness of the sheet butted against the registration roller pair 108 based on the feature quantity input from the feature quantity acquirer 206.

In the feedback control according to the present embodiment, the drive controller 201 outputs a control value based on the target value and the feedback value of the rotation speed of the rotator 203. In other words, the control is based on the rotation speed. Hereinafter, such a control is referred to as "speed control". Additionally, the control is also based on the rotation position of the registration roller pair 108. Hereinafter, such a control is referred to as "position control". In the present embodiment, the thickness of the sheet is determined based on the feature quantity acquired in the position control of the registration roller pair 108.

In the position control, the FB acquirer 205 calculates the rotation position of the rotator 203 based on the number of times that the marker is detected, and inputs the calculated value to the drive controller 201 as a feedback value. In addition, the amount of rotation required to reach the rotation position is also input to the drive controller 201 as a target value. The drive controller 201 generates and outputs a control value for controlling rotation of the rotator 203 based on the difference between the target value and the feedback value. Thus, the rotation position of the rotator 203 is maintained at the input target value.

A stop control that brings the registration roller pair 108 to a stopped state at a predetermined rotation position is hereinafter called as hold control. In the hold control, the engine controller 31 inputs to the drive controller 201 a rotation position of the rotator 203 that corresponds to a position at which the registration roller pair 108 is to be stopped as a target value. The drive controller 201 generates a control value for rotating the rotator 203 at the rotation position corresponding to the target value based on the difference between the feedback value input from the FB acquirer 205 and the target value, and inputs the calculated value to the rotary driver 202.

Figure 6:
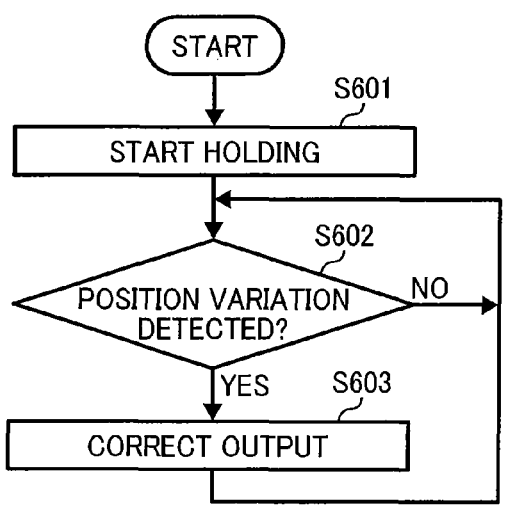
FIG. 6 is a flowchart illustrating an operation in a hold control in accordance with an embodiment of the present invention.

FIG. 6 is a flowchart illustrating an operation in the hold control. As the hold control starts (S601), the FB acquirer 205 inputs a feedback value to the drive controller 201 at regular intervals even under the condition in which the rotation position of the rotator 203 is controlled to become a target value.

Every time the drive controller 201 acquires a feedback value from the FB acquirer 205, the drive controller 201 determines whether the rotation position of the rotator 203 is displaced from the target value or not, i.e., whether a position variation has occurred or not (S602). If it is determined that no position variation has occurred (NO in S602), the drive controller 201 continues to input the present control value to the rotary driver 202.

If it is determined that a position variation has occurred (YES in S602), the rotary driver 202 corrects the output control value to be input to the rotary driver 202 according to the generated position variation so as to bring the rotation position of the rotator 203 closer to the target value (S603).

In the hold control, the target value input from the engine controller 31 to the drive controller 201 directly serves as a value for designating the rotation position of the rotator 203. Since the rotator 203 is a motor for rotating the registration roller pair 108, the target value input from the engine controller 31 results in a value for stopping the registration roller pair 108 at a designated stop position.

Similarly, the hold control directly serves as a control for stopping the rotator 203 at a designated rotation position, and results in a control for stopping the registration roller pair 108 at a designated position. Thus, a signal output from the rotary driver 202 based on the control value output from the drive controller 201 directly serves as a control value for rotating the rotator 203, and results in a control value for rotating the registration roller pair 108.

A state in which rotation of the rotator 203 is stopped due to the hold control is defined as a state in which a torque externally applied to the rotator 203 and a torque generated in the rotator 203 due to a driving signal given from the rotary driver 202 to the rotator 203 are balanced. Therefore, the case where a position variation is detected in S602 corresponds to a case where the external force applied to the rotator 203 has changed and the torque externally applied to the rotator 203 has varied.

To return the rotation position to the target value, the rotary driver 202 should perform a drive control such that the rotator 203 is applied with a torque for restoring the position that has been varied due to the change in external force, and a torque balanced with the changed external force should be continuously applied to the rotator 203. Such a control is achieved by changing the condition of the drive control performed by the rotary driver 202 for the rotator 203 in the process in S603 and repeating the process in S602.

In detecting the thickness of sheet according to the present embodiment, upon butting of a sheet against the registration roller pair 108 under the hold control, the registration roller pair 108 rotates owing to a force transmitted thereto from the sheet. The thickness of the sheet is detected based on a value obtained by the roller drive controller 200 when the rotation position of the registration roller pair 108 advances due to the butting of the sheet and then returns.

The roller drive controller 200 is a rotary drive controller including the rotator 203 serving as a motor for generating an actual rotational force. The roller drive controller 200 controls rotation of the rotator 203 to drive-control the registration roller pair 108. The components of the roller drive controller 200 other than the rotator 203 function as a roller controller for controlling the registration roller pair 108 through controlling the rotator 203. The roller controller directly serves as a rotation controller for controlling rotation of the rotator 203 that is a motor, resulting in a motor controller.

The components of the roller drive controller 200 other than the rotator 203 are composed of a combination of software and hardware. The rotary driver 202 for giving a driving signal to the rotator 203 is composed of hardware for outputting the drive signal. The rotation detector 204 is composed of hardware for detecting rotation, as described above.

On the other hand, each of the drive controller 201, the FB acquirer 205, the feature quantity acquirer 206, and the sheet thickness determiner 207 is configured as a calculator (e.g., CPU) performs a calculation according to software for executing each function.

In the present embodiment, a motor driven by a feedback control is employed as the rotator 203, and the rotary driver 202 generates and outputs a drive voltage based on a control value input from the drive controller 201. Therefore, in the case where the output from the rotary driver 202 is used as the value indicating the condition of the feed roller, the drive voltage is used therefor. In this case, the feature quantity acquirer 206 needs a function of converting the drive voltage that is a PWM output into a value indicating a duty cycle.

In the case where a voltage driving motor is employed as the rotator 203, the rotary driver 202 outputs a voltage in accordance with a control value input from the drive controller 201. In the case where a current driving motor is employed as the rotator 203, the rotary driver 202 outputs a current in accordance with a control value input from the drive controller 201. Such a voltage or current value can be used as the feature quantity.

In the present embodiment, rotation of the rotator 203 is detected by detecting the marker on the circular disc rotating along with rotation of the rotator 203, for the feedback control. Such a method is just an illustrative example, and any other method can be employed so long as the amount of rotation and rotation speed of the rotator 203 can be detected. For example, the rotation state of the rotator 203 can be detected by another method in which the rotary driver 202 generates a 2-ch false encoder signal based on a signal obtained from a Hall element provided to the rotator 203 for recognizing the rotation state of the rotator 203. In addition, a magnetic encoder can also be used.

According to the configuration illustrated in FIG. 5, the registration roller pair 108 is drive-controlled by the roller drive controller 200. Similarly, the feed roller pair 103 is also drive-controlled by the configuration similar to that illustrated in FIG. 5. In the case where there is no need to detect the thickness of sheet at the feed roller pair 103, the feature quantity acquirer 206 and the sheet thickness determiner 207 may be omitted.

Figure 7:
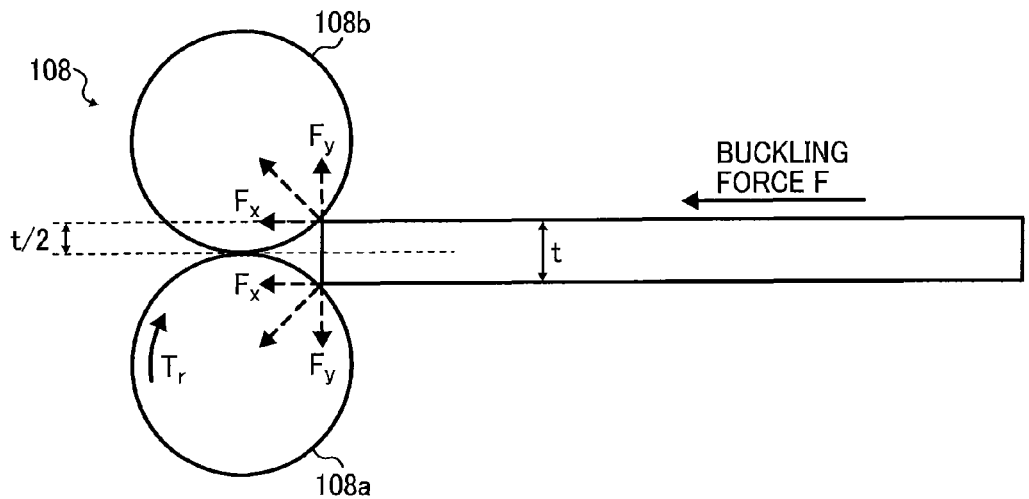
FIG. 7 is an illustration for explaining a principle of detecting the thickness of a sheet in accordance with an embodiment of the present invention.

A sheet thickness determination operation by the roller drive controller 200 is described below. FIG. 7 is an illustration of a sheet having a thickness of t at the time of butting against the registration roller pair 108. The registration roller pair 108 includes a driving roller 108*a* to be rotated by the rotator 203 and a pressure roller 108*b* pressed against the driving roller 108*a* to rotate along with rotation of the driving roller 108*a*.

A buckling force F is a force for feeding a sheet before the sheet is allowed to butt against the registration roller pair 108, further fed, and allowed to bend to buckle. As shown in FIG. 7, the buckling force F transmits in a normal direction at each position where the sheet contacts each of the rollers. The force transmitted in a normal direction is decomposed into a force $F_x$ transmitted in an X-axis direction and a force $F_y$ transmitted in a Y-axis direction, as shown in FIG. 7. The force $F_y$ is canceled by a pressure from the pressure roller 108*b*.

Thus, the buckling force F is decomposed into the force $F_x$ transmitted in the X-axis direction in both the driving roller 108*a* and the pressure roller 108*b* while applying a torque thereto. Since the rotational force of the pressure roller 108*b* is applied from the driving roller 108*a*, the force $F_x$ to be applied to the pressure roller 108*b* is also applied to the driving roller 108*a*. Therefore, the equation $F=2\times F_x$ is satisfied.

A torque $T_r$ applied to the registration roller pair 108 by the buckling force F is represented by the equation $T_r=F(r-t/2)$, where r represents the radius of each roller and t represents the thickness of the sheet. Since t/2 is sufficiently smaller than r in actual, the equation $F=T_r/r$ is satisfied.

Accordingly, under the condition where the rotator 203 is under the hold control, it is possible to estimate the buckling force F of the sheet based on the torque of the registration roller pair 108 after the sheet butts against the registration roller pair 108 but before the sheet bends.

The buckling force F of the sheet is represented by the formula $F=\sigma_{cr} \times A$, where A represents an area of a plane of the sheet perpendicular to a stress direction and $\sigma_{cr}$ represents a buckling stress. The area A is represented by $t \times a$, where a represents the width of the sheet. Therefore, the buckling stress $\sigma_{cr}$ is represented by the formula $\sigma_{cr}=F/(a \times t)$.

The buckling stress $\sigma_{cr}$ is calculated by the following formula (1), where C represents a coefficient of fixity, E represents a Young's modulus, and b represents an interval of application of stress.

$$\sigma_{cr} = \frac{C\pi^2 E b^2}{a^2} \quad (1)$$

The buckling force F is represented by the following formula (2) in view of the formula (1) and the relationship between the buckling stress and the buckling force.

$$F = \frac{C E \pi^2 t b^2}{a} \quad (2)$$

The thickness t of the sheet is represented by the formula (3) based on the formula (2).

$$t = \frac{Fa}{C E \pi^2 b^2} \quad (3)$$

In the formula (3), the parameters other than the buckling force F are already known. Therefore, the thickness t of the sheet butted against the registration roller pair 108 can be determined by determining the buckling force F based on the toque of the rotator 203.

The torque $T_r$ of the motor is represented by the formula $T_r=k_t \times I$, where $k_t$ represents a torque constant and I represents a current. Since the current I is represented by the formula I=V/R, where V represents a voltage and R represents a resistance, the equation $T_r=k_t \times V/R$ is satisfied. Under the condition where the buckling force F and the torque of the registration roller pair 108 are balanced, the buckling force F is represented by the following formula (4) in view of the above-described relationship $F=T_r/r$.

$$F = \frac{k_t V}{rR} \quad (4)$$

The thickness t of the sheet butted against the registration roller pair 108 is represented by the following formula (5) in view of the formulae (3) and (4).

$$t = \frac{k_t V a}{C E \pi^2 b^2 rR} \quad (5)$$

In the formula (5), the parameters other than the voltage V are already known and can be treated as constants. Accordingly, the thickness t of the sheet butted against the registration roller pair 108 can be represented by a linear function of the voltage V applied to the rotator 203. Since the drive voltage applied to the rotator 203 is a PWM output, the voltage V is calculated from the amplitude of the drive voltage and the duty cycle of the PWM output.

Figure 8A:
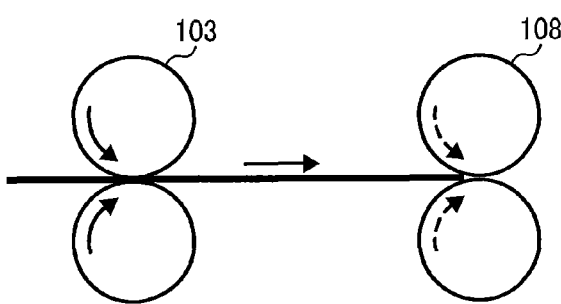
FIGS. 8A to 8C are state diagrams of a sheet being fed in accordance with an embodiment of the present invention.
Figure 8B:
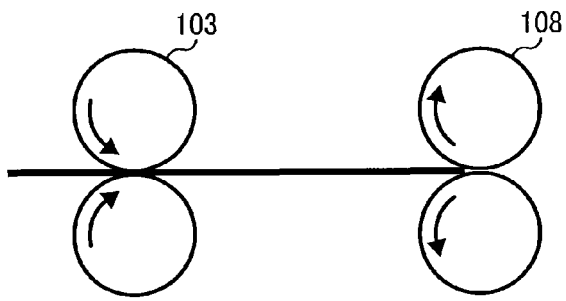
Figure 8C:
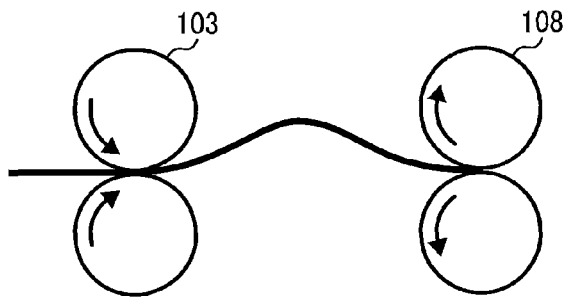

A control operation for the registration roller pair 108 in the case where a sheet fed by the feed roller pair 103 is allowed to butt against the registration roller pair 108 in the hold state is described below. FIGS. 8A to 8C are state diagrams of a sheet allowed to butt against the registration roller pair 108 and further fed to bend.

Figure 9A:
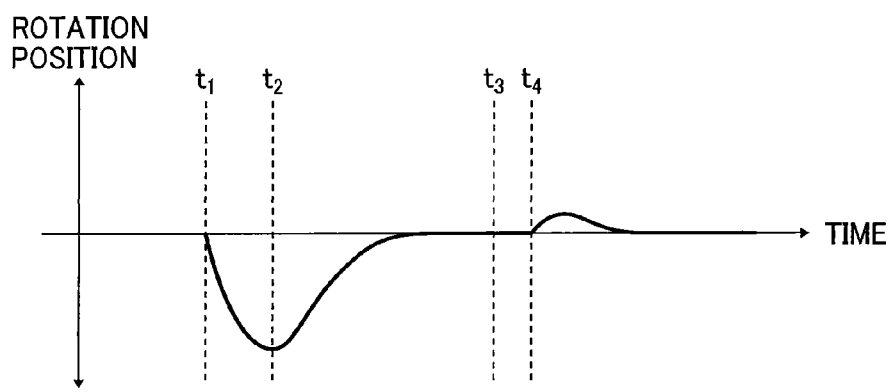
FIGS. 9A to 9C are graphs indicating information obtained through the feeding of sheet in accordance with an embodiment of the present invention.
Figure 9B:
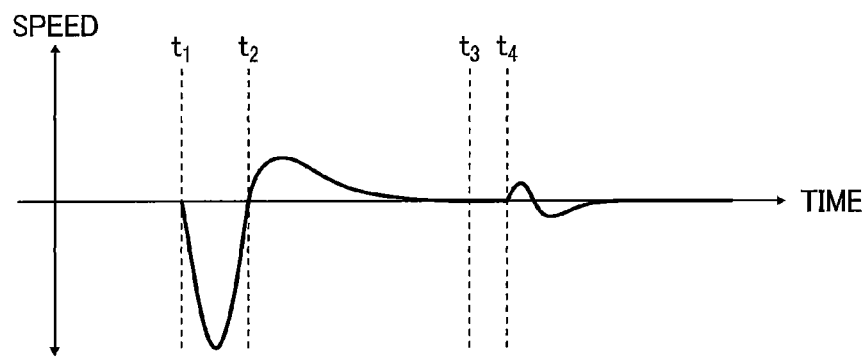
Figure 9C:
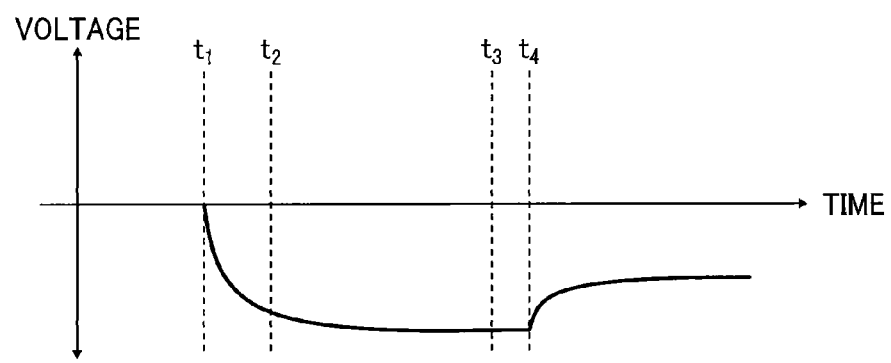

Referring to FIG. 8A, as a sheet fed by the feed roller pair 103 butts against the registration roller pair 108, the registration roller pair 108 rotates by a force applied from the sheet to the registration roller pair 108. FIGS. 9A to 9C are graphs respectively showing time variations of the rotation position of the rotator 203, the rotation speed of the rotator 203, and the voltage applied from the rotary driver 202 to the rotator 203, through the states illustrated in FIGS. 8A to 8C. In FIGS. 8A to 8C, solid-line arrows indicate rotations of the rollers for the purpose of feeding a sheet, and dotted-line arrows indicate rotations of the rollers caused by the force applied from the sheet.

At a timing t1 shown in FIGS. 9A to 9C, a sheet butts against the registration roller pair 108 as illustrated in FIG. 8A. As the sheet butts against the registration roller pair 108 and the registration roller pair 108 is rotated due to the force transmitted from the sheet, the rotation position of the rotator 203 is displaced from the hold position as illustrated in FIG. 9A, and the rotation speed of the rotator 203 is varied from zero as shown in FIG. 9B.

Since the registration roller pair 108 is under the hold control, the driving signal given from the rotary driver 202 to the rotator 203 is corrected when the rotation position of the rotator 203 is displaced from the hold position, as explained with reference to FIG. 6. As a result, the voltage is varied as shown in FIG. 9C.

As the driving signal given from the rotary driver 202 to the rotator 203 is varied, the rotation speed of the rotator 203 rotating due to the force from the sheet starts to return to that in the original state in which rotation of the rotator 203 is stopped. At the state where rotation of the rotator 203 is stopped, indicated by a timing t2 in FIG. 9A, a variation in rotation position of the rotator 203 becomes maximum.

FIG. 8B shows a state in which the rotation position of the registration roller pair 108 is being returned to its original position from the displaced position under the hold control. After the displacement of the rotation position of the rotator 203 is detected at the timing $t_1$, the rotary driver 202 keeps on outputting a driving signal for rotating the rotator 203 so as to return the rotation position of the rotator 203 to the original position.

Within the period between the timings $t_1$ and $t_2$ shown in FIGS. 9A and 9C, the rotator 203 starts generating a torque for rotating the rotator 203 in the reverse direction. At the timing $t_2$ shown in FIG. 9A, the rotation position of the rotator 203 starts returning to the hold position. At a timing $t_3$ shown in FIG. 9A, the buckling force F before the sheet bends to buckle comes into balance with the torque exerted by the rotator 203 for pushing back the sheet. The voltage applied from the rotary driver 202 to the rotator 203 at this time corresponds to the voltage V defined in the formula (5).

As the sheet is further fed by the feed roller pair 103, the sheets bends as shown in FIG. 8C. As a result, at a timing $t_4$ shown in FIG. 9C, the force applied from the sheet to the registration roller pair 108 is reduced, and the voltage applied from the rotary driver 202 to the rotator 203 to hold the registration roller pair 108 is varied.

Figure 10:
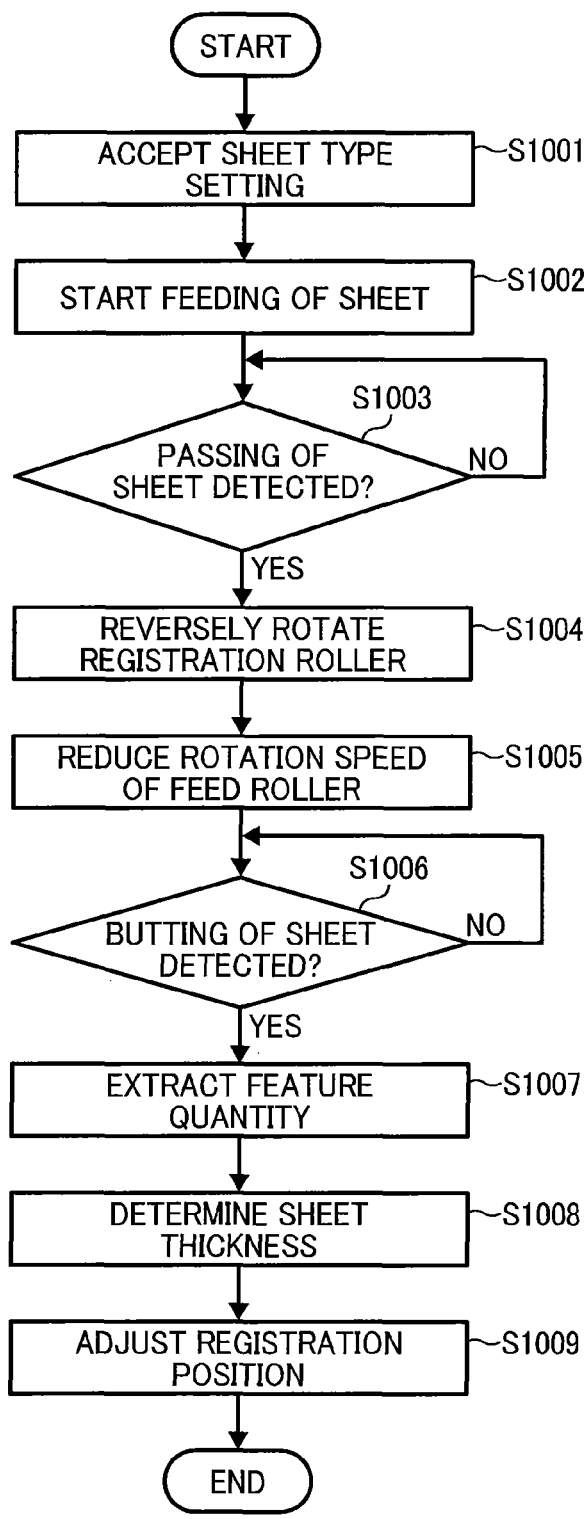
FIG. 10 is a flowchart illustrating a sheet feeding operation in accordance with an embodiment of the present invention.

In the present embodiment, within the range illustrated in FIGS. 9A to 9C, the amount of feed of the sheet by the feed roller pair 103 for causing the sheet to bend as illustrated in FIG. 8C is controlled based on the thickness of the sheet detected according to the voltage V immediately before the timing $t_4$. In the present embodiment, the feed roller pair 103, the registration roller pair 108, the roller drive controller having a similar configuration to FIG. 5 for drive-controlling the feed roller pair 103, and the engine controller 31 for giving commands to the roller drive controller 200 operate together to function as a sheet feeder. In particular, the engine controller 31 and the roller drive controller for drive-controlling the feed roller pair 103 operate together to function as a feed roller controller for controlling rotation of the feed rollers. FIG. 10 is a flowchart illustrating a sheet feeding operation in accordance with an embodiment of the present invention.

Figures 11, 12:
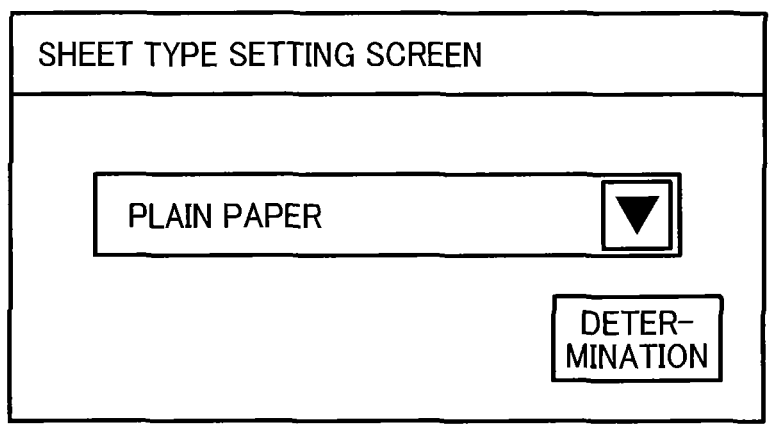
FIG. 11 is an illustration of a sheet type setting screen in accordance with an embodiment of the present invention.
FIG. 12 is an example of a Young's modulus table in accordance with an embodiment of the present invention.

First, the controller 20 accepts a sheet type setting upon operation on the display panel 24 of the image processing apparatus 1 (S1001). FIG. 11 is an illustration of a sheet type setting screen displayed on the display panel 24 in S1001. User operates the display panel 24 to select the type of sheet, the thickness of which is to be detected.

The engine controller 31 notifies the roller drive controller 200 of the type of sheet selected on the display panel 24, and the sheet thickness determiner 207 acquires the type of sheet. This operation determines the Young's modulus E defined in the formula (5). The sheet thickness determiner 207 is holding a Young's modulus table that connects sheet type, Young's modulus, and sheet width, as is illustrated in FIG. 12. The sheet thickness determiner 207 recognizes the Young's modulus and the width of the sheet to be fed based on information on the acquired sheet type.

Next, the feed roller pair 103 starts feeding the sheet under the control by the engine controller 31 (S1002). The engine controller 31 is monitoring the detection state of the sheet passing sensor 109 illustrated in FIG. 4. The engine controller 31 keeps on inputting a command value with respect to the feed speed to the drive controller 201 so as to maintain the normal feed speed until the sheet passing sensor 109 detects a sheet.

As the sheet reaches the detection position of the sheet passing sensor 109 and the sheet passing sensor 109 detects the sheet (YES in S1003), the engine controller 31 controls the registration roller pair 108 to reversely rotate (hereinafter "reverse control") to be prepared for a butting by the sheet (S1004). The reverse control is performed in S1004 to remove the influence of a backlash which is caused between the registration roller pair 108 and the rotator 203.

Figure 13A:
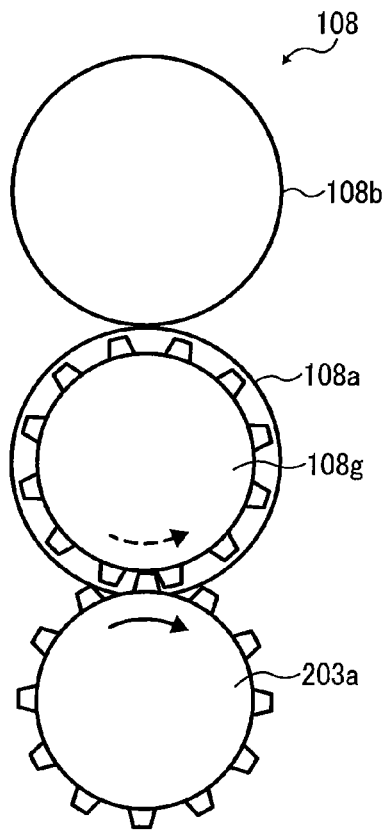
FIGS. 13A and 13B are illustrations for explaining a backlash.
Figure 13B:
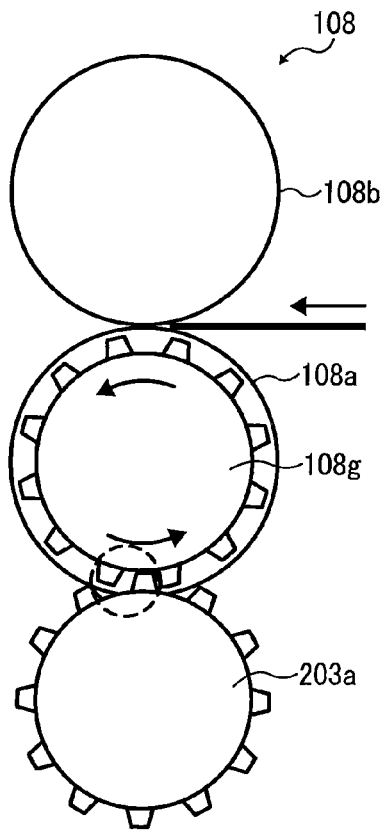

FIGS. 13A and 13B are illustrations for explaining a backlash caused between the registration roller pair 108 and the rotator 203. In FIGS. 13A and 13B, solid-line arrows represent primary rotations caused by an external force generated upon butting of a sheet, and dotted-line arrows represent secondary rotations caused by power transmitted from the primary rotation through a gear. Since a sheet is fed from right to left in FIGS. 13A and 13B, a case in which the driving roller 108a of the registration roller pair 108 is rotated in the direction indicated by the arrow shown in FIG. 13A and then stopped is considered below.

In this case, a registration gear 108g for transmitting power of the rotator 203 to the registration roller pair 108 and a gear 203a of the rotator 203 are engaged with each other as shown in FIG. 13A. As the sheet fed by the feed roller pair 103 butts against the registration roller pair 108 from the right side, the driving roller 108a is rotated in the direction indicated by the arrow shown in FIG. 13B by the force generated by the butting.

As the driving roller 108a having stopped with the gear engagement state illustrated in FIG. 13A is rotated in the direction indicated by the arrow shown in FIG. 13B, the registration gear 108g idly rotates until transmitting the power to the gear 203a because the gear engagement is incomplete with respect to the direction of rotation thereof. The area within which the idle rotation occurs is encircled by dotted-line in FIG. 13B.

Figure 14:
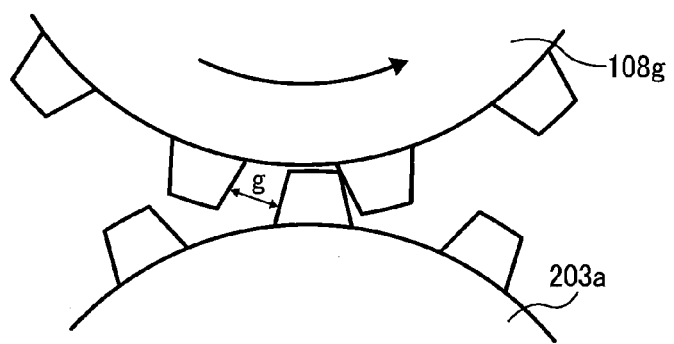
FIG. 14 is an illustration for explaining a backlash.

FIG. 14 is a magnified view of the area encircled by dotted-line in FIG. 13B. As shown in FIG. 14, the registration gear 108g idly rotates for a distance corresponding to a gap g until coming into contact with the gear 203a to transmit the power thereto. This gap g is called as the "backlash".

Since the rotator 203 does not rotate during the idle rotation, the rotation detector 204 never detects rotation of the rotator 203 during the idle rotation. On the other hand, as explained with reference to FIGS. 9A to 9C, the thickness of the sheet is determined upon detecting rotation of the registration roller pair 108 upon detecting rotation of the rotator 203. Therefore, in the case where the rotator 203 does not rotate although the registration roller pair 108 does rotate, an error is caused in determining the thickness of the sheet.

Figure 15A:
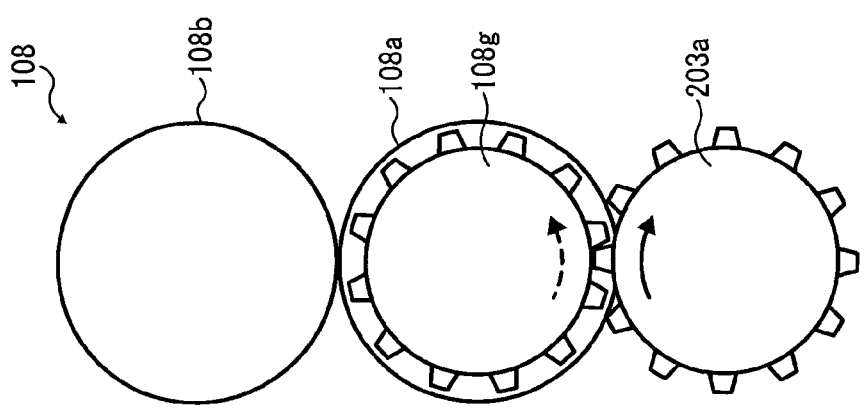
FIGS. 15A to 15C are illustrations for explaining a rotary drive for eliminate a backlash in accordance with an embodiment of the present invention.
Figure 15B:
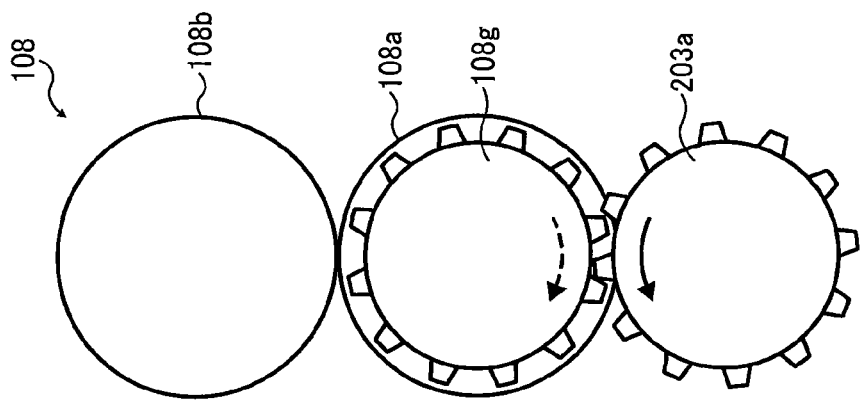
Figure 15C:
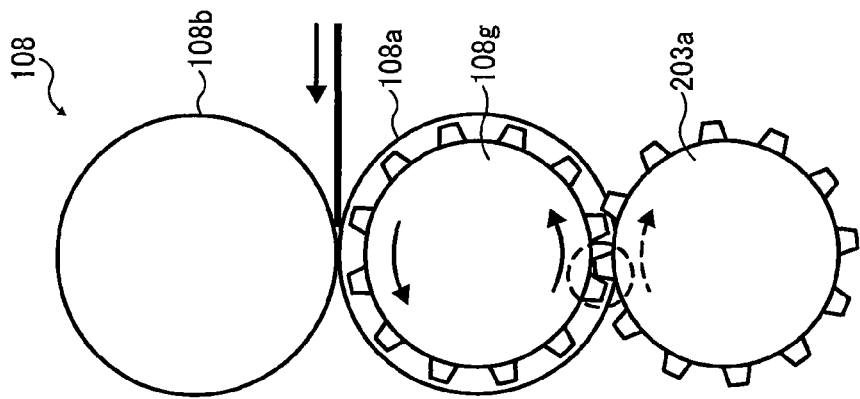

FIGS. 15A to 15C are illustrations for explaining a backlash elimination process. Similar to FIG. 13A, FIG. 15A illustrates a state in which the rollers have stopped after feeding a sheet. As the registration roller pair 108 is reversely rotated in S1004 in FIG. 10, the gear engagement state between the registration gear 108g and the gear 203a transits from the state illustrated in FIG. 15A to the state illustrated in FIG. 15B.

FIG. 15C illustrates a state in which a sheet butts against the registration roller pair 108 having stopped with the gear engagement state illustrated in FIG. 15B from the right side. In this case, the driving roller 108a is rotated upon butting of the sheet in the direction that the gear engagement is achieved. Therefore, the registration gear 108g can transmit the power to the gear 203a without idly rotating in the area encircled by dotted line shown in FIG. 15C. Thus, the accuracy in determining the thickness of the sheet based on detection of rotation of the rotator 203 is improved.

As the sheet passing sensor 109 detects a sheet in S1003, the engine controller 31 starts reducing the rotation speed of the feed roller pair 103 (S1005). In particular, in S1005, the engine controller 31 changes a target value to be input to the drive controller 201 to reduce the rotation speed of the feed roller pair 103. The reduced rotation speed corresponds to the speed of feeding the sheet at the time the sheet butts against the registration roller pair 108.

By reducing the rotation speed of the feed roller pair 103 at the time of the sheet butting against the registration roller pair 108, an adverse effect which may be caused when the sheet butts against the registration roller pair 108 at an excessively-high speed can be eliminated. Specific examples of the adverse effect which may be caused when the sheet butts against the registration roller pair 108 at an excessively-high speed may include: a folding of the tip of the sheet; and the occurrence of a slippage between the registration roller pair 108 and the sheet which causes a displacement of the registration position.

The sheet detected by the sheet passing sensor 109 is further fed by the feed roller pair 103 while the rotation speed thereof is kept reduced. The engine controller 31 continues the sheet feeding operation at the reduced rotation speed until the sheet butts against the registration roller pair 108 (NO in S1006). As the sheet butts against the registration roller pair 108, a change is caused at the timing t1 as shown in FIGS. 9A to 9C. The sheet thickness determiner 207 acquires the parameters shown in FIGS. 9A to 9C, i.e., information on the rotation position, rotation speed, drive voltage of the rotator 203, from the feature quantity acquirer 206, and detects butting of the sheet against the registration roller pair 108 based on the changes in these parameters (YES in S1006).

The determination in S1006 is made based on a threshold set for each of the parameters shown in FIGS. 9A to 9C. Namely, when the parameters shown in FIGS. 9A to 9C exceed the thresholds thereof, the sheet thickness determiner 207 can determine that the sheet has butted against the registration roller pair 108 as illustrated in FIG. 8A. Such a determination can be based on either all of or a part of the parameters shown in FIGS. 9A to 9C.

As butting of the sheet against the registration roller pair 108 is detected, the sheet thickness determiner 207 extracts a voltage value at a time immediately before the timing t4 in FIG. 9C among various feature quantities acquired by the feature quantity acquirer 206 (S1007). This extracted value corresponds to the voltage V defined in the formula (5).

The voltage V at a time immediately before the timing t4 can be determined based on a change caused in the voltage as illustrated in FIG. 9C. In particular, the sheet thickness determiner 207 may refer to the temporal change of the voltage applied from the rotary driver 202 to the rotator 203, and may employ the voltage value at which the amount of change thereof becomes maximum within a predetermined period starting from the detection of butting in S1006 in FIG. 10 among various feature quantities acquired by the feature quantity acquirer 206.

Alternatively, the sheet thickness determiner 207 may analyze the amount of change in the voltage that is increasing after the timing t1 as shown in FIG. 9C and employ the voltage value at which the amount of change shifts from increment to decrement.

After extracting the voltage V, the sheet thickness determiner 207 calculates and determines the thickness t of the sheet based on the formula (5) using the Young's modulus E and the sheet width a obtained in S1001 and the voltage V extracted in S1004 (S1008). The interval b of application of stress is a fixed value corresponding to the interval between the feed roller pair 103 and the registration roller pair 108. In the present embodiment, the thickness of the sheet is determined by the above-described operation.

The sheet thickness determiner 207 then inputs the determined sheet thickness to the drive controller 201. The drive controller 201 adjusts the registration position while the sheet is butting against the registration roller pair 108 (S1009), and the operation ends.

In S1009, the drive controller 201 adjusts the target position of the rotator 203 input from the engine controller 31 based on the determined sheet thickness. A principle of operation in S1009 is described below with reference to FIGS. 16A and 16B. FIG. 16A is an illustration showing a state in which a sheet having a certain thickness is butting against the registration roller pair 108. FIG. 16B is an illustration showing a state in which another sheet thinner than the sheet illustrated in FIG. 16A is butting against the registration roller pair 108.

In FIG. 16A, a distance between the nip portion of the registration roller pair 108 and the leading edge of the sheet is identified as g1. Referring to FIG. 16B, the leading edge of the sheet is much closer to the nip portion since the sheet is much thinner. Therefore, a distance g2 between the nip portion and the leading edge of the sheet in FIG. 16B is shorter than the distance g1. Thus, a difference in the registration position is caused between the states illustrated in FIGS. 16A and 16B, the amount of which corresponding to g1-g2.

The drive controller 201 corrects the target value of the rotation position of the rotator 203 so as to eliminate the difference g1-g2 based on the determination result acquired from the sheet thickness determiner 207. This correction operation solves the problem that the position of the leading edge of the sheet varies depending on the thickness of the sheet. In particular, the drive controller 201 is holding a table that connects sheet thickness and adjustment value, as is illustrated in FIG. 17. The drive controller 201 selects an appropriate adjustment value corresponding to the determined sheet thickness to correct the target value.

Alternatively, the table illustrated in FIG. 17 may be held by the sheet thickness determiner 207 so that the sheet thickness determiner 207 can notify the drive controller 201 of the adjustment value. The process in S1009 in FIG. 10 utilizes the determination result of the sheet thickness. However, this process is not necessary in detecting the sheet thickness.

In the sheet feeder according to the present embodiment, a feedback-controlled motor is used as a driver for the registration roller pair 108. At the time a sheet butts against the feedback-controlled registration roller pair 108 in the hold state, the thickness of the sheet is determined based on a parameter value obtained in the feedback control.

At this time, since the registration roller pair 108 is in the hold state without feeding sheet, the parameter value obtained in the feedback control includes no error cause (e.g., frictional load caused due to sheet feeding) which may generate in the process of feeding sheet. Thus, the thickness of the sheet can be detected based on the load on the rollers at a high degree of accuracy.

In the present embodiment, in determining the thickness of the sheet, the rotator 203 is reversely rotated before entering the hold control upon butting of the sheet against the registration roller pair 108, so as to eliminate a backlash caused between the rotator 203 and the registration roller pair 108, i.e., caused in the power transmission mechanism. Thus, upon butting of the sheet, the registration gear 108g and the gear 203a of the rotator 203 come to engage with each other in the direction that the registration roller pair 108 is forced to rotate upon butting of the sheet, as explained above with reference to FIGS. 15A to 15C.

As a result, the backlash is eliminated. The forced rotation of the registration roller pair 108 caused upon butting of the sheet is immediately transmitted to the rotator 203 without becoming an idle rotation relative to the gear 203a. Thus, the thickness of the sheet can be determined based on the parameter value in the feedback control at a high degree of accuracy.

The above embodiment is described based on a case in which the feedback value obtained upon butting of the sheet against the hold-controlled registration roller pair 108 is used. Such a case is just an illustrative example. The feedback value is not limited to that obtained upon butting of the sheet so long as it is obtained upon application of a load from the sheet to the hold-controlled rollers, in detecting the conditions (e.g., thickness) of the sheet.

Accordingly, the control for eliminating backlash is performed not only in the case in which the registration roller pair 108 against which the sheet butts is hold-controlled. For example, the following case is also acceptable: the registration roller pair 108 already sandwiching a sheet is hold-controlled, and a load is applied from the sheet to the roller pair as another roller feeds the sheet.

The above embodiment is described based on a case in which the feature quantity acquirer 206 acquires a voltage value V applied from the rotary driver 202 to the rotator 203 and the sheet thickness determiner 207 calculates the thickness t of the sheet based on the formula (5) using the voltage value V. This is an illustrative example of the case in which the rotary driver 202 outputs a voltage value as a feedback value. According to another embodiment, the thickness t of the sheet may be calculated based on a control value for controlling the rotator 203 obtained in the feedback control.

For example, a duty cycle of the drive voltage may be output as a feedback value. In this case, the thickness t of the sheet can be calculated based on the duty cycle obtained as the feedback value by using the formula (5) in which the voltage V is converted into the duty cycle.

The above embodiment is described based on a case in which the thickness of the sheet is determined by a calculation using the formula (5). This is just an illustrative example. The thickness of the sheet may be determined using any parameter obtained in the feedback control by the roller drive controller 200, achieving the same effect.

As an example, a case in which the sheet to be fed is one of the predetermined types of paper, as is shown in FIG. 12, is considered below. In this case, the relationship between feature quantities that are various parameters obtained upon butting of each type of sheet against the registration roller pair 108 and the thickness of each type of sheet is memorized in advance. The thickness of the butted sheet can be determined by extracting a thickness of one of the sheets associated with a feature quantity which is closest to the actually-obtained feature quantity.

Figures 18, 19:
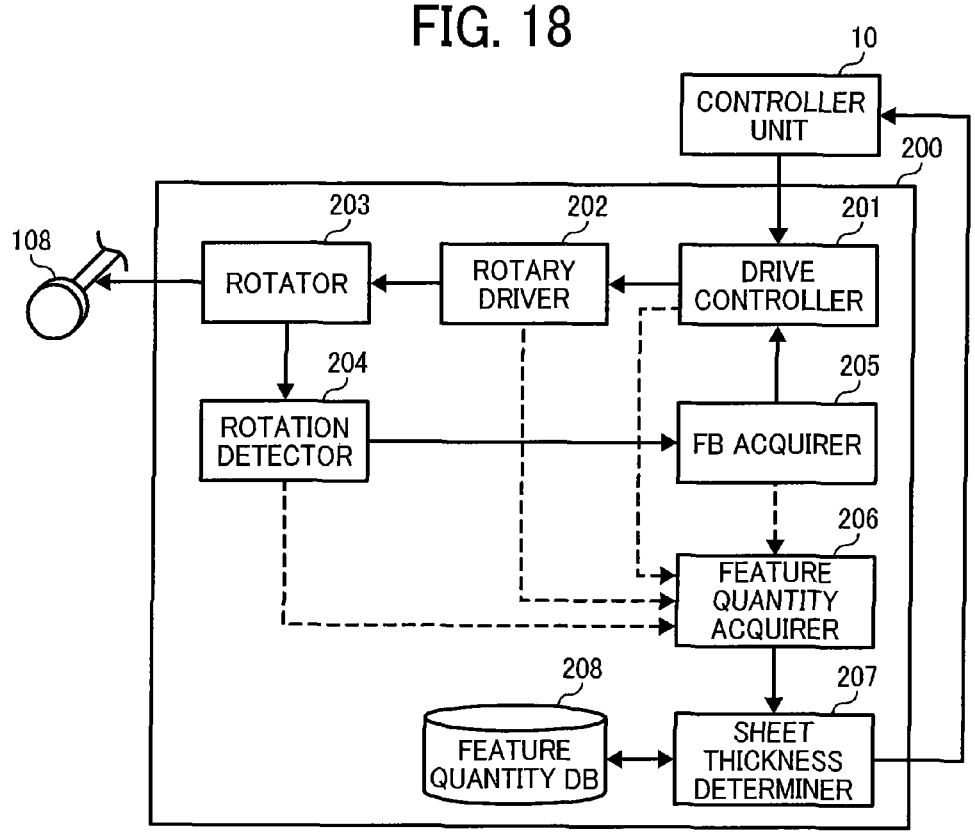
FIG. 18 is a block diagram illustrating a functional configuration of the registration roller in accordance with an embodiment of the present invention.
FIG. 19 is an example of a feature quantity DB in accordance with an embodiment of the present invention.

FIG. 18 is a functional block diagram of the roller drive controller 200 in the above-described case. FIG. 18 is almost same as FIG. 5 but is different in that a feature quantity DB 208 is provided. FIG. 19 shows information included in the feature quantity DB 208.

As shown in FIG. 19, the feature quantity DB 208 consists of information on "sheet thickness" associated with "feature quantity data" and "sheet type". Thus, the feature quantity DB 208 is used as sheet thickness information. The "feature quantity data" refers to a parameter value obtained in the feedback control upon butting of a sheet against the registration roller pair 108. An illustrative example of the feature quantity data is described below with reference to FIGS. 20A to 20C.

Figure 20A:
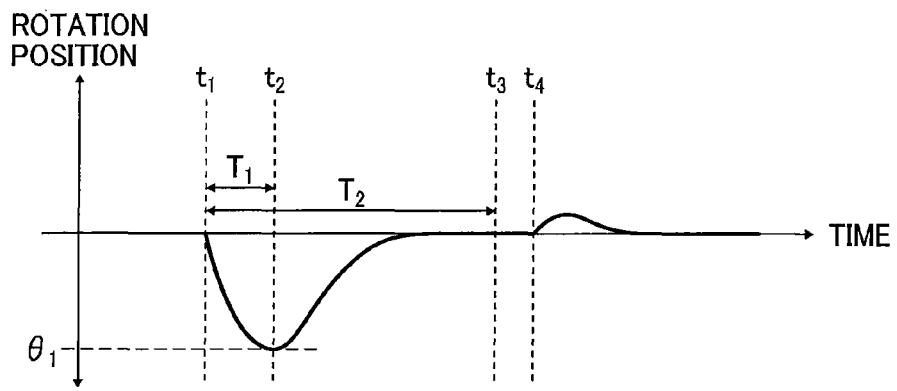
FIGS. 20A to 20C are graphs indicating examples of the feature quantity in accordance with an embodiment of the present invention.

For example, as shown in FIG. 20A, a maximum value $\theta_1$ with respect to the rotation position of the rotator 203 caused by a rotation forced by the sheet, can be employed as the feature quantity data. Alternatively, a time $T_1$ that elapses after the rotator 203 is rotated before the rotation position reaches the maximum value $\theta_1$, or a time $T_2$ that elapses after the rotator 203 is rotated before the rotation position returns to the hold position, may also be used as the feature quantity data.

Figure 20B:
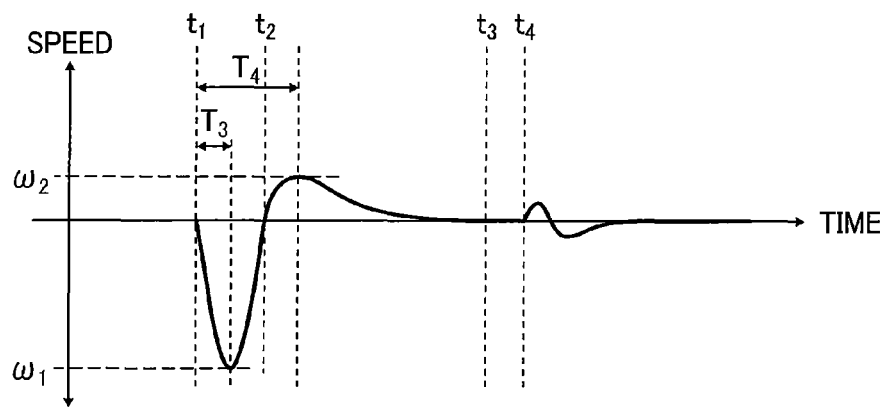

In addition, as shown in FIG. 20B, a maximum value $\omega_1$ or another maximum value $\omega_2$ in the opposite direction with respect to the rotation speed of the rotator 203 caused by a rotation forced by the sheet, can be employed as the feature quantity data. Alternatively, a time $T_3$ that elapses after the rotator 203 is rotated before the rotation speed reaches the speed reaches the maximum value $\omega_2$, may also be used as the feature quantity data.

Figure 20C:
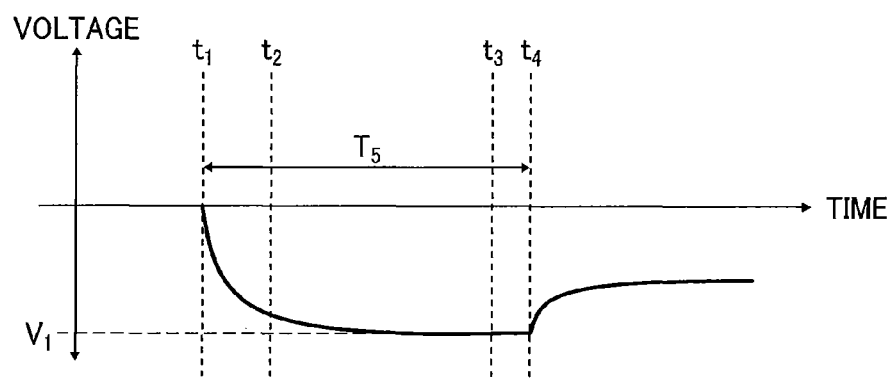

Moreover, as shown in FIG. 20C, a voltage $V_1$ obtained when the buckling force of the sheet and the torque of the rotator 203 are balanced out can be used as the feature quantity data. Alternatively, a time $T_5$ that elapses after the rotator 203 is rotated and returned to the hold state before the sheet buckles to reduce a necessary torque may also be used as the feature quantity data.

Such a reference to the feature quantity DB 208 makes it possible for the sheet thickness determiner 207 to determine the sheet thickness based on the feature quantity input from the feature quantity acquirer 206 and the sheet type input in S1001 in FIG. 10.

The above embodiment is described based on a control performed in an image forming apparatus in which a sheet (serving as a recording medium) butts against the registration roller pair 108 that adjusts a sheet feeding timing to the sheet feeding path through which the sheet is fed. This is just an illustrative example. The above control is also applicable to a sheet feeder for feeding sheet-like materials in which a butting roller is feedback-controlled and hold-controlled so as to stop at a designated rotation position.

Accordingly, the above control is applicable to not only the case in which the print engine 26 feeds sheets, but also to the case in which the ADF 21 feeds documents to the scanner unit 22. Thus, it makes it possible to detect the thickness of the document to be read at a high degree of accuracy and to form a bend in an amount according to the thickness of the document.

The above embodiment is described based on a case in which a timing for reversely rotating the registration roller pair 108 is coincided with a timing that a sheet is detected by the sheet passing sensor 109 disposed between the feed roller pair 103 and the registration roller pair 108. This is just an illustrative example. The registration roller pair 108 may be reversely rotated when the feet reaches a predetermined feed position on an upstream side relative to the direction of feed of the sheet.

At least, the registration roller pair 108 is reversely rotated before entering the hold control for detecting the thickness of sheet using a feedback value.

Accordingly, the registration roller pair 108 may be reversely rotated every time the registration roller pair 108 being driven to rotate for further feeding a sheet downstream from the registration roller pair 108 is stopped. In the case in which the mechanism for drive-controlling the feed roller pair 103 has a control function similar to that illustrated in FIG. 5 and an entry of a sheet to the feed roller pair 103 is detectable by a feedback value, the registration roller pair 108 may be reversely rotated upon entry of the sheet to the feed roller pair 103. Alternatively, the registration roller pair 108 may be reversely rotated upon feeding of a sheet in S1002 in FIG. 10.

The above embodiment is described based on a case in which the thickness of the sheet is detected based on a feedback value obtained through the control of rotation of the registration roller pair 108. This is just an illustrative example, and various conditions other than the thickness of the sheet can be detected. Any condition can be detected by preparing a calculation formula for calculating a condition of a target to be detected, such as the formula (5), or a table such as that illustrated in FIG. 19.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A sheet feeder, comprising:
a roller to feed a sheet;
a motor to rotate the roller; and
a motor controller to control rotation of the motor by a feedback control,
wherein the motor controller detects a condition of the sheet based on a value acquired in the feedback control at the time a load is applied from the sheet to the roller, while performing a stop control to stop the roller at a designated stop position, and
wherein the stop control is performed after the motor is idly rotated in a direction opposite to a direction of feed of the sheet for a distance corresponding to a gap g between a tooth of a drive gear and an adjacent tooth of a driven gear, and wherein the motor controller transmits no power to the roller during idle rotation.

2. The sheet feeder according to claim 1, wherein the motor controller performs the stop control after the motor controller rotates the motor to rotate the roller in the direction of feed of the sheet.

3. The sheet feeder according to claim 1, wherein the motor controller performs the stop control at the time of detecting the condition of the sheet.

4. The sheet feeder according to claim 1, wherein the motor controller performs the stop control at the time the sheet reaches a specific feed position upstream from the roller.

5. The sheet feeder according to claim 4, further comprising:
a sheet passing sensor to detect the sheet at an upstream side from the roller,
wherein the motor controller performs the stop control when the sheet passing sensor detects the sheet.

6. The sheet feeder according to claim 4, further comprising:
a secondary roller disposed on an upstream side from the roller,
wherein the motor controller performs the stop control when the sheet is detected at the secondary roller.

7. The sheet feeder according to claim 1, further comprising:
a sheet storage to store a plurality of sheets,
wherein the motor controller performs the stop control at the time the sheet storage starts feeding one of the sheets.

8. The sheet feeder according to claim 1,
wherein the motor controller performs the stop control by acquiring a value related to a rotation position of the motor in the feedback control, and outputting a control value for rotating the motor so as to bring the rotation position closer to the stop position based on a difference between the stop position and the rotation position, and
wherein the motor controller detects the condition of the sheet based on the control value output at the time the sheet applies a load to the roller under the stop control.

9. An image processing apparatus, comprising:
the sheet feeder according to claim 1; and
a print engine.

10. The sheet feeder according to claim 1, wherein a surface of each tooth on a gear of the roller which faces in a same direction as the direction of feed of the sheet is directly engaged with a gear of the motor while the motor controller is performing the stop control.

11. The sheet feeder according to claim 1, wherein the condition of the sheet is a sheet thickness.

12. The sheet feeder according to claim 11, wherein the motor controller controls rotation of the roller based on an adjustment value corresponding to a detected sheet thickness.

13. The sheet feeder according to claim 1, wherein the motor is idly rotated in the direction opposite to a direction of feed of the sheet from a first position whereby a first tooth of the drive gear is in contact with the adjacent tooth of the driven gear, to a second position whereby a second tooth of the drive gear is in contact with the adjacent tooth of the driven gear.

14. A method of feeding a sheet by a roller, comprising:
controlling a motor for rotating the roller by a feedback control;
detecting a condition of the sheet based on a value acquired in the feedback control at the time a load is applied from the sheet to the roller, while performing a stop control to stop the roller at a designated stop position; and performing the stop control after the motor is idly rotated in a direction opposite to a direction of feed of the sheet for a distance corresponding to a gap g between a tooth of a drive gear and an adjacent tooth of a driven gear, and wherein controlling the motor includes transmitting no power to the roller during idle rotation.

15. A non-transitory recording medium storing a plurality of instructions which, when executed by one or more processors, cause the processors to perform a method, comprising:

controlling a motor for rotating the roller by a feedback control;

detecting a condition of the sheet based on a value acquired in the feedback control at the time a load is applied from the sheet to the roller, while performing a stop control to stop the roller at a designated stop position; and performing the stop control after the motor is idly rotated in a direction opposite to a direction of feed of the sheet for a distance corresponding to a gap g between a tooth of a drive gear and an adjacent tooth of a driven gear, and wherein controlling the motor includes transmitting no power to the roller during idle rotation.

* * * * *